(12) United States Patent
Brown et al.

(10) Patent No.: US 7,987,511 B2
(45) Date of Patent: Jul. 26, 2011

(54) E-MAIL WITH SECURE MESSAGE PARTS

(75) Inventors: Michael K. Brown, Kitchener (CA); Mike Kirkup, Waterloo (CA); Michael S. Brown, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 1203 days.

(21) Appl. No.: 11/285,198

(22) Filed: Nov. 23, 2005

(65) Prior Publication Data

US 2007/0116281 A1   May 24, 2007

(51) Int. Cl.
- H04N 7/167 (2006.01)
- H04N 7/16 (2006.01)
- G06F 7/04 (2006.01)
- G06F 17/30 (2006.01)

(52) U.S. Cl. ............... 726/27; 726/28; 726/29; 726/30; 380/239

(58) Field of Classification Search ............ 380/239; 726/27, 28, 29, 30
See application file for complete search history.

(56) References Cited

U.S. PATENT DOCUMENTS

| | | | |
|---|---|---|---|
| 5,239,679 A | 8/1993 | Murai | |
| 5,958,005 A | 9/1999 | Thorne et al. | |
| 6,643,684 B1 | 11/2003 | Malkin et al. | |
| 6,769,067 B1 * | 7/2004 | Soong | 726/2 |
| 7,113,948 B2 * | 9/2006 | Jhingan et al. | 1/1 |
| 7,519,984 B2 * | 4/2009 | Bhogal et al. | 726/2 |
| 2002/0178381 A1 * | 11/2002 | Lee et al. | 713/201 |
| 2003/0093565 A1 * | 5/2003 | Berger et al. | 709/246 |
| 2003/0188183 A1 * | 10/2003 | Lee et al. | 713/200 |
| 2004/0049696 A1 * | 3/2004 | Baker et al. | 713/201 |
| 2006/0019639 A1 * | 1/2006 | Adams et al. | 455/412.2 |
| 2007/0208762 A1 * | 9/2007 | Lunt et al. | 707/100 |

FOREIGN PATENT DOCUMENTS

| | | |
|---|---|---|
| CA | 2263171 A1 | 12/1998 |
| CA | 2396415 A1 | 7/2001 |
| EP | 1365340 A | 11/2003 |
| WO | 0122243 A1 | 12/1998 |
| WO | 2004107687 A | 12/2004 |

OTHER PUBLICATIONS

"A security analysis of Pretty Good Privacy" by Sieuwert van Otterloo, dated Sep. 7, 2001; pp. 17, 55 and 56.
Extended European Search Report issued in respect of EP Patent Application No. 05111192.0.
International Search Report of Application PCT/CA2005/000961, date of mailing Sep. 13, 2005—3 pgs.

* cited by examiner

*Primary Examiner* — Kambiz Zand
*Assistant Examiner* — Aubrey H Wyszynski
(74) *Attorney, Agent, or Firm* — Ridout & Maybee LLP

(57) ABSTRACT

A method for preventing a recipient of an electronically transmitted message from taking at least one action in relation to the message is disclosed. The message has at least two parts with one of the parts having a higher level of security than the other part. The method includes the step of extracting information from the message. The information indicates that the higher level security part is not permitted to have the action taken on it while the other part is so permitted. The method also includes the step of preventing the higher level security part from having the action taken on it in reaction to said recipient making an offending request.

18 Claims, 4 Drawing Sheets

E-MAIL WITH SECURE MESSAGE PARTS

FIELD

The present invention relates to e-mails that have secure message parts and, in particular, to methods and systems for keeping secure message parts of e-mails protected.

BACKGROUND

Handheld electronic devices are commonly used to store and display messages. Devices that are enabled for wireless communication may also be used for sending and receiving messages. Where possible, the devices have been provided with a messaging application having a user interface similar to the user interface found for similar applications on a desktop computer. Also, some of the messaging applications that run on handheld electronic devices have mechanisms to reduce the risk of outbound e-mails having their contents exposed by way of illicit interception. Possible mechanisms include encryption software for creating encrypted e-mails.

In addition to encrypting e-mails, it is possible that the security risk can be reduced further by additional means. For example, through the use of PGP™ (Pretty Good Privacy) software, it is possible to mark a message so that it can only be viewed (in the PGP™ application) with a "secure" viewer. Forcing the message to be viewed in this viewer means the message will be viewed in a tempest resistant font. A possible limitation of this PGP™ method is that it only addresses how to view certain data at the node of the message receiver.

Accordingly, it would be advantageous to improve methods and systems for keeping secure message parts of e-mails protected.

BRIEF DESCRIPTION OF THE DRAWINGS

Reference will now be made, by way of example, to the accompanying drawings which show example embodiments of the present invention, and in which.

Similar reference numerals may have been used in different figures to denote similar components.

DESCRIPTION OF EXAMPLE EMBODIMENTS

Figure 1:
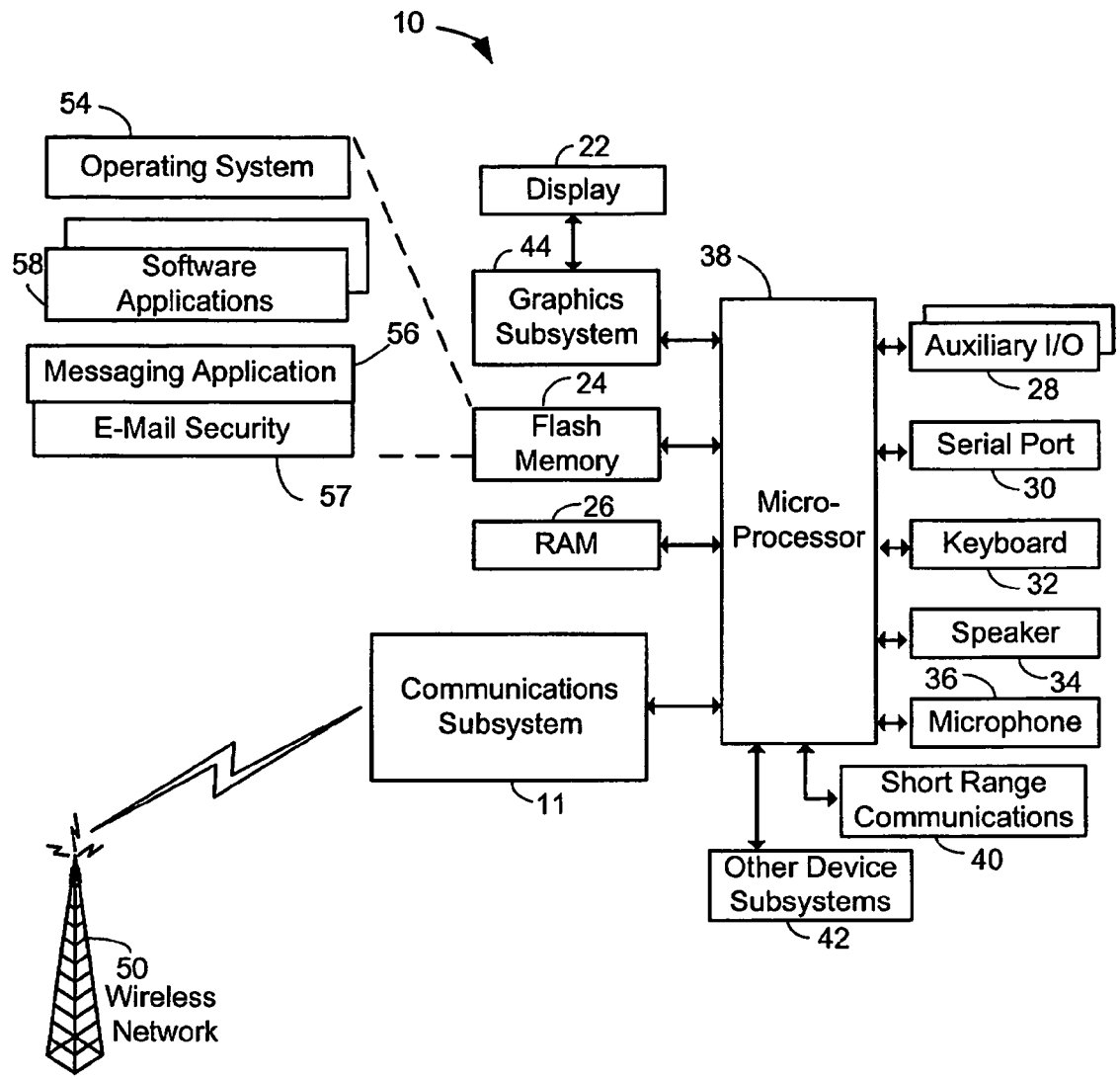
FIG. 1 shows a block diagram of a user device to which the present invention can be applied in an example embodiment.

According to one example of the invention is a method for preventing a recipient of an electronically transmitted message from taking at least one action in relation to the message. The message has at least two parts with one of the parts having a higher level of security than the other part. The method includes the step of extracting information from the message. The information indicates that the higher level security part is not permitted to have the action taken on it while the other part is so permitted. The method also includes the step of preventing the higher level security part from having the action taken on it in reaction to the recipient making an offending request.

According to another example of the invention is a handheld electronic device having a messaging application permitting a recipient of an electronically transmitted message to take actions in relation to the message. The handheld device includes a display screen. A processor is in electronic communication with the display screen. The processor is capable of controlling operation of the display screen. At least one computer readable medium stores code and is in electronic communication with the processor. The code includes computer executable instructions for extracting information from the message. The information indicates that at least a first part of the message is not permitted to have a certain action taken on it while at least a second part of the message is so permitted. The code also includes computer executable instructions for preventing the first part from having the certain action taken on it in reaction to the recipient making an offending request.

According to another example of the invention is a computer program product having a computer readable medium storing a messaging application. The messaging application can process an electronically transmitted message having at least two parts with one of the parts having a higher level of security than the other part. A recipient of the message is prevented from taking at least one action in relation to the message. The messaging application includes code for extracting information from the message. The information indicates that the higher level security part is not permitted to have the action taken on it while the other part is so permitted. The messaging application also includes code for preventing the higher level security part from having the action taken on it in reaction to the recipient making an offending request.

The following description of specific embodiments of the invention does not limit the implementation of the invention to any particular computer programming language or system architecture. The present invention is not limited to any particular operating system, mobile device architecture, or computer programming language. Moreover, although some of the embodiments described below include mobile devices, the present invention is not limited to mobile devices; rather, it may be embodied within a variety of user devices or terminals, including handheld devices, mobile telephones, personal digital assistants (PDAs), personal computers, audiovisual terminals, televisions, and other devices. One skilled in the art will appreciate that messaging applications can be installed on most of these user devices and terminals.

Any references herein to "messages" are not intended to be limited to e-mail, but should be understood to include other types of messages that one skilled in the art would understand to be possible in the context in which the term is being used. Other types of messages include text messages, audio messages, video messages, and other items, including calendar entries, tasks, and other date-related items.

Referring now to the drawings, FIG. 1 is a block diagram of a user device to which the present invention can applied in an example embodiment. In the example embodiment, the user device is a two-way mobile communication device 10 having data and possibly also voice communication capabilities. In an example embodiment, the device 10 has the capability to communicate with other computer systems on the Internet. Depending on the functionality provided by the device 10, in various embodiments the device may be a data communication device, a multiple-mode communication device configured for both data and voice communication, a mobile telephone, a PDA enabled for wireless communication, or a computer system with a wireless modem, among other things.

In the illustrated embodiment, the device 10 includes a communication subsystem 11. In one embodiment, the communication subsystem 11 may include a receiver, a transmitter, and associated components such as one or more, preferably embedded or internal, antenna elements, and a processing module such as a digital signal processor (DSP). As will be apparent to those skilled in the field of communications, the particular design of the communication subsystem 11 will be dependent in part upon the communication network in which the device 10 is intended to operate.

Signals received by the device 10 from a wireless communication network 50 are input to the receiver of the communication subsystem 11, which may perform such common receiver functions as signal amplification, frequency down conversion, filtering, channel selection and the like. In a similar manner, signals to be transmitted are processed, including modulation and encoding for example, by the DSP and input to the transmitter for digital to analog conversion, frequency up conversion, filtering, amplification and transmission over the wireless communication network 50.

The device 10 includes a microprocessor 38 that controls the overall operation of the device. The microprocessor 38 interacts with the communications subsystem 11 and also interacts with further device subsystems such as a graphics subsystem 44, flash memory 24, random access memory (RAM) 26, auxiliary input/output (I/O) subsystems 28, serial port 30, keyboard or keypad 32, speaker 34, microphone 36, a short-range communications subsystem 40, and any other device subsystems generally designated as 42. The graphics subsystem 44 interacts with the display 22 and renders graphics and/or text upon the display 22.

Operating system software 54 and various software applications 58 used by the microprocessor 38 are, in one example embodiment, stored in a persistent store such as flash memory 24 or similar storage element. Those skilled in the art will appreciate that the operating system 54, software applications 58, or parts thereof, may be temporarily loaded into a volatile store such as RAM 26. It is contemplated that received communication signals may also be stored to RAM 26.

The microprocessor 38, in addition to its operating system functions, can enable execution of software applications 58 on the device. A predetermined set of software applications 58 which control basic device operations, including data and voice communication applications for example, will normally be installed on the device 10 during manufacture. Further software applications 58 may also be loaded onto the device 10 through the network 50, an auxiliary I/O subsystem 28, serial port 30, short-range communications subsystem 40 or any other suitable subsystem 42, and installed by a user in the RAM 26 or a non-volatile store for execution by the microprocessor 38. Such flexibility in application installation increases the functionality of the device and may provide enhanced on-device functions, communication-related functions, or both. For example, secure communication applications may enable electronic commerce functions and other such financial transactions to be performed using the device 10.

In a data communication mode, a received signal such as a text message or web page download will be processed by the communication subsystem 11 and input to the microprocessor 38, which will preferably further process the received signal for output to the display 22 through the graphics subsystem 44, or alternatively to an auxiliary I/O device 28. A user of device 10 may also compose data items within a software application 58, such as e-mail messages for example, using the keyboard 32 in conjunction with the display 22 and possibly an auxiliary I/O device 28 such as, for example, a thumbwheel. Such composed items may then be transmitted over a communication network through the communication subsystem 11.

The serial port 30 in FIG. 1 would normally be implemented in a personal digital assistant (PDA)-type communication device for which synchronization with a user's desktop computer (not shown) may be desirable, but Is an optional device component. Such a port 30 would enable a user to set preferences through an external device or software application and would extend the capabilities of the device by providing for information or software downloads to the device 10 other than through a wireless communication network.

A short-range communications subsystem 40 is a further component which may provide for communication between the device 10 and different systems or devices, which need not necessarily be similar devices. For example, the subsystem 40 may include an infrared device and associated circuits and components or a Bluetooth™ communication module to provide for communication with similarly enabled systems and devices. The device 10 may be a handheld device.

Wireless mobile network 50 is, in an example embodiment, a wireless packet data network, (e.g. Mobitex™ or DataTAC™), which provides radio coverage to mobile devices 10. Wireless mobile network 50 may also be a voice and data network such as GSM (Global System for Mobile Communication) and GPRS (General Packet Radio System), CDMA (Code Division Multiple Access), or various other third generation networks such as EDGE (Enhanced Data rates for GSM Evolution) or UMTS (Universal Mobile Telecommunications Systems). In some example embodiments, network 50 is a wireless local area network (WLAN) operating, for example, in conformance with one or more IEEE 802.11 protocols. In some example embodiments, the device 10 is configured to communicate over both wireless wide are networks and wireless local area networks.

In one embodiment, the software resident on the device 10 includes a messaging application 56 for sending, receiving and displaying messages or other items, such as tasks, calendar items, etc. An example of a very well known software application similar to the messaging application 56 is the Microsoft Outlook™ software application produced by the Microsoft Corporation. There exists a variety of publications that provide instructions for developing and creating messaging applications. Furthermore, software is currently available for building messaging applications. Accordingly, code-level programming specifics need not be described herein in order for one skilled in the art to build a messaging application having any of the functionality disclosed herein. Associated with the messaging application 56 is an e-mail security module 57 for configuring the device 10 to perform at least some of the email security functions described herein. In the presently described embodiment, module 57 is a sub-component of messaging application 56, however in alternative embodiments all or portions of module 57 may be part of another software application or may be a separate software application.

It is again noted that the present application is not limited to use in association with e-mail messages and may apply to other messages where possible, including SMS messages, and other "items", including calendar entries, task list entries, and other items having a date associated with them. References in the present application to "messages" or a "messaging application" should be understood to encompass and include possibilities within this wider range of items.

Figure 2:
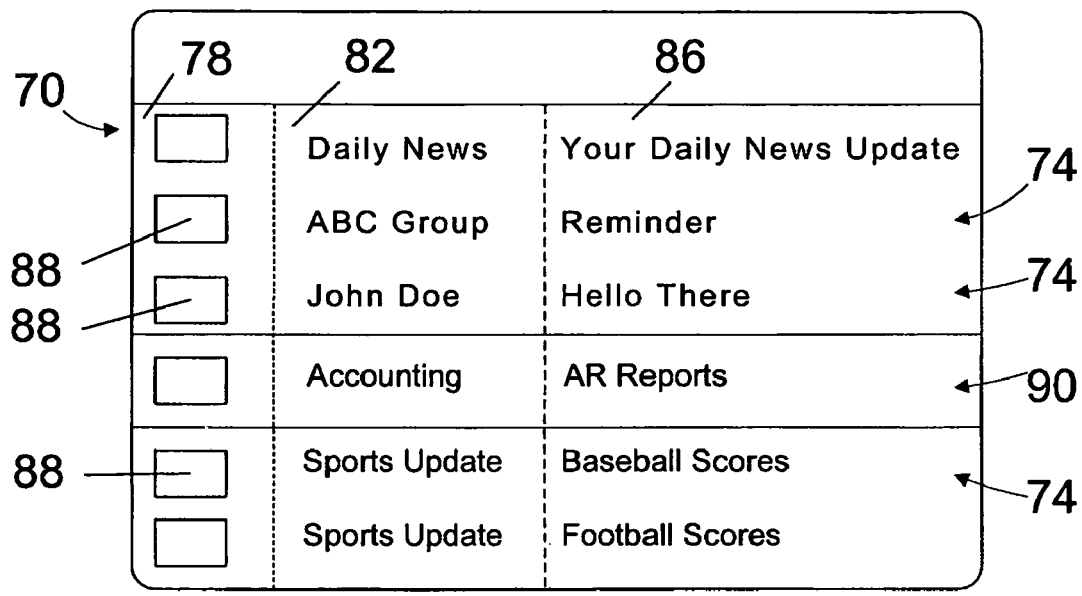
FIG. 2 shows, in diagrammatic form, a first screen shot of a possible messaging application for the device of FIG. 1.

Referring to FIG. 2, a screen shot 70 generated by an example embodiment of the messaging application 56 is illustrated. The screen shot 70 corresponds to what the display of a mobile communication device might look like after a user has requested that the messaging application 56 display received messages in a list. This is typically done by clicking on an icon or a particular list selection associated with a request to display inbox folder contents.

In the screen shot 70, a plurality of messages 74 are listed vertically. Going from left to right in the screen shot 70, there is a message icon column 78, a sender identifier column 82 and a message subject column 86. Icons 88 in the icon column 78 can provide information about the e-mails with which they are associated. For example, an icon 88 associated with an e-mail that has already been read can provide this information to the user by means of an appropriate graphical image displayed to the user (e.g. an envelope with its flap opened). Similarly an appropriate graphical image could be used for an e-mail that has not been read (e.g. an envelope with its flap closed). The columns 82 and 86 also provide information about the messages 74. In the column 82, the names of the people who sent the e-mails 74 are listed. In the column 86, the subject lines of the e-mails 74 are shown.

It will be understood that the display of the mobile communication device could show additional/fewer and/or different columns than those shown in FIG. 2. Some examples of alternative columns are importance, flag status, presence of attachment(s), received date, and message size. Due to the typical width of the display of a mobile communication device, it will normally not be desirable to have a large number of columns, and it will normally be desirable to show the columns that provide the most useful information keeping in mind that the user is probably looking for a particular message at the stage shown in FIG. 2.

Message 90 of the messages 74 has been highlighted by the user. The sender of the message 90 is Accounting, and the subject line of the message is "AR Reports". The user in this example now requests, using one or more of the input devices of his mobile communication device, that the message 90 be opened.

Figure 3:
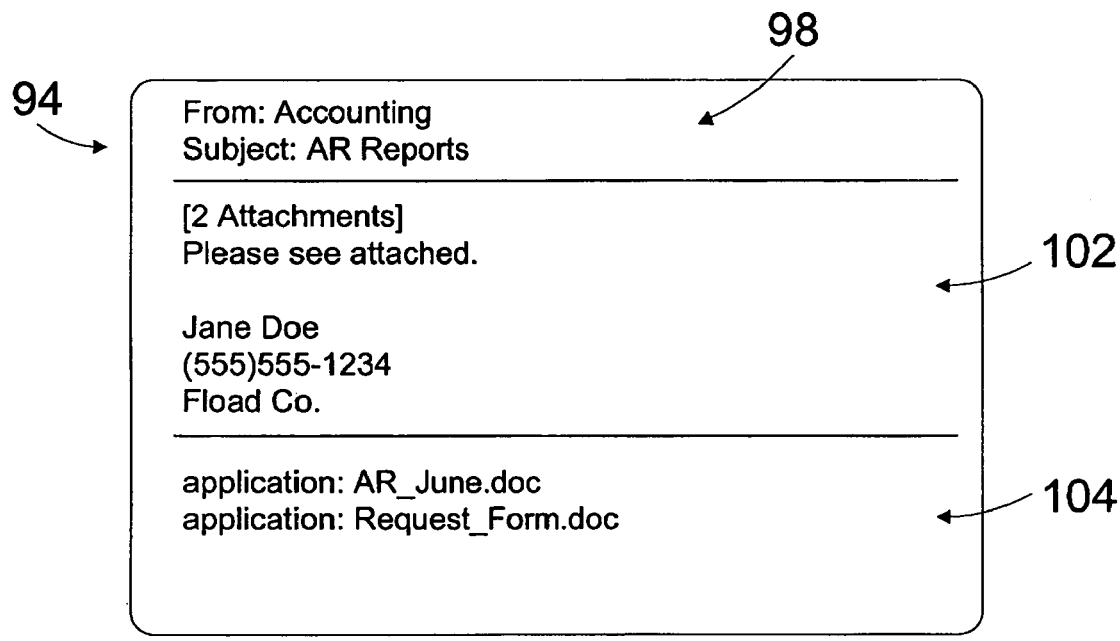
FIG. 3 shows, in diagrammatic form, a second screen shot of the messaging application of FIG. 2, the second screen shot being that of a displayed message.

FIG. 3 is a screen shot 94 of the displayed message 90. Message header 98 repeats the information of the message 90 contained in the columns 82 and 86 of the screen shot 70. It will be understood that the header 98 could show additional/ less and/or different information than what is shown. Below the header 98 is a message section 102 that contains the text of the message, and the section 102 is commonly referred to as the message body. Below the message body 102 is a section 104 providing a description of two attachments to the message 90. The message 90 has three parts. One of the parts is the text of the message, and the other two parts are the two attachments.

In the present example, the user reads the message body 102. From reading the message body 102, the user learns that Jane Doe in accounting has sent him two files, in particular, two Word™ documents. Assuming the user is reading the message from top to bottom, the user then learns (after reading the section 104) that the two Word™ documents that Jane Doe has sent him are "AR_June.doc" and "Request_form. doc".

In the present example, the message body 102 and the two documents listed in the section 104 were encoded in the Multipurpose Internet Mail Extension (MIME) standard during the process by which the message was sent. MIME is an official Internet standard that specifies how messages should be formatted so that they can be exchanged between different message systems. MIME is also a specification for the format of non-text message attachments that allows the attachment to be sent over the Internet.

In the illustrated example, the conversion of attachments (such as the two attachments in the example e-mail) from MIME to files or vice versa is normally handled by the messaging application 56 (FIG. 1). When the file is stored on the device 10, it is up to the operating system 54 to map one of the applications 58 to the file type.

When a MIME formatted message is processed by the messaging application 56, information is extracted from the message. Many different types of information can be extracted from messages, and some examples of possible types of extractable information are the content types in the message, body parts, how the message data is encoded, the version of the MIME standard that the message conforms to, the sender of the message, and the date and time the message was sent. Also, one skilled in the art will appreciate that information can be extracted from MIME attributes of a message.

Figure 4:
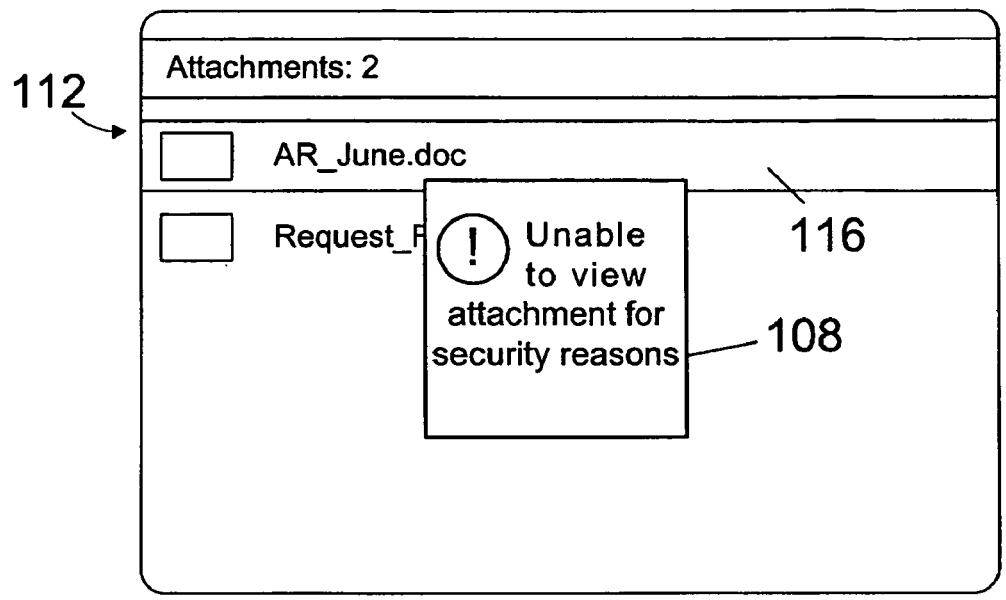
FIG. 4 shows, in diagrammatic form, a screen shot taken after a person tries to open an attachment of the displayed message.

Continuing on with the example message from Accounting to the next screen shot shown in FIG. 4, the messaging application 56 in this example embodiment offers the user the ability to proceed to a screen where the attachments of the message 90 are listed for selection. At this stage the screen is as illustrated in screen shot 112, except initially without dialog window 108. In the screen shot 112, message attachment 116, which is "AR_June.doc", is highlighted and ready for selection. (It will be kept in mind that the ways in which a user opens the attachments of a message vary depending on the messaging application. In some messaging applications, message attachments are opened by clicking on icons in the message body).

It will be understood that in some messaging system architectures within which the device 10 can operate, the example received message may require, when at least some parts of the message need to be reviewed, the outbound sending of these message parts through the communications subsystem 11 (FIG. 1) to an attachment server. The purpose of the attachment server being that it formats and/or decodes various message parts for viewing on the device. This procedure however might have the potential of compromising intended level of security because there could be transmission of one or more message parts in a decoded (or unsatisfactorily coded) format over a public network during this procedure. For these example embodiments, the use of MIME attributes in relation to the message parts could enable prevention of undesired transmission of message parts to servers such as an attachment server.

Taking the message attachment 116 as an example, the user attempts to use one or more of the input devices of his mobile communication device to open the message attachment 116. The messaging application however has processed a MIME attribute which the messaging application interprets to mean that the attachment will not be sent off of the device. In this example, the attachment is not to be displayed to the user because it cannot be sent to the attachment server for decoding as a result of the attachment's MIME attribute being "Content-Forwarding: denied". Conversely, the attachment would, in this example, be permitted to be sent to the attachment server, and thus could be displayed to the user if its MIME attribute was "Content-Forwarding: allowed".

Thus, for the above example, the message attachment 116 is not decoded for viewing on the device. Instead the dialog window 108 informs the user that the message attachment 116 cannot be viewed due to security reasons.

It will be understood that there are a variety of alternative ways in which the user could be made aware that his request offends a security precaution and that the message attachment 116 cannot be viewed. For example, there could simply be a beep that sounds when the user requests to open the message attachment 116.

Figure 5:
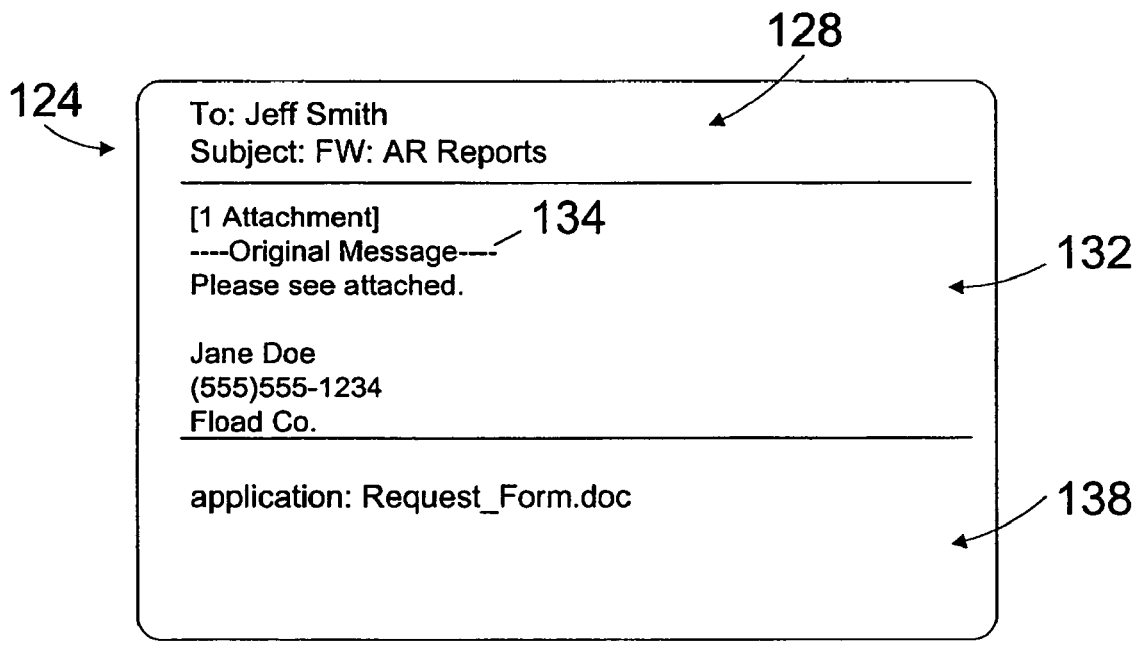
FIG. 5 shows, in diagrammatic form, a screen shot illustrating a message forwarding example with a message attachment being the message part marked with one or more action restrictions in this example.

Still with reference to the example message from Accounting, FIG. 5 is a screen shot 124 illustrating a forwarded message composition derived from the original message 90. It will be understood that the request by the device user in this example to forward a message can in fact be viewed as a bundle of requests including a request to forward the message text, a request to forward the "AR_June.doc" attachment and a request to forward the "Request_Form.doc" attachment.

As indicated in message header 128, the forwarded message is going to be sent to a person named Jeff Smith. The message body 102 of the original message 90 is contained within message body 132 of the forwarded message. An indicator or separator line 134 indicates where the message body 102 of the original message 90 begins.

"AR_June.doc" is missing from the message to be forwarded. The user of the mobile communication device recognizes this because that attachment is not shown in region 138 of the device's display. Along with the attachment not being shown in the region 138, it will be understood that there are a number of additional ways in which the user could be made aware that "AR_June.doc" will not be forwarded. For example, a dialog window could appear to warn the user.

The attachment does not go with the forwarded message because the messaging application has determined that a MIME attribute for the attachment indicates that content forwarding is not allowed with respect to that attachment. In an example embodiment, the attachment is not to be included with the forwarded message if its MIME attribute is "Content-Forwarding: denied", and the attachment is permitted to be included with the forwarded message if its MIME attribute is "Content-Forwarding: allowed". Parts of a message having the MIME attribute "Content-Forwarding: denied" have a higher level of security than those parts of the message having the MIME attribute "Content-Forwarding: allowed". With respect to the example message from Accounting, the "AR_June.doc" part of the message has a higher level of security than the message text and "Request_Form.doc" message parts.

Forwarding prevention of one or more message parts (such as the "AR_June.doc" attachment) may reduce security concerns in various situations. As an example, security concerns may be reduced when the original message is in a secure format and the derived message is sent out in a format that is not secure.

Figure 6:
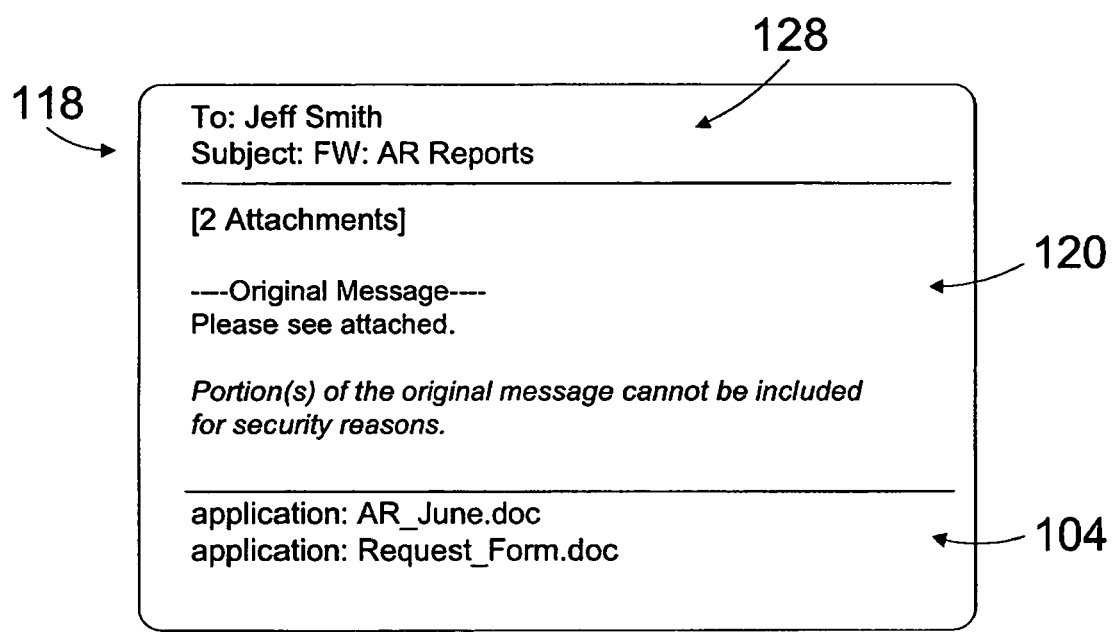
FIG. 6 shows, in diagrammatic form, a screen shot illustrating an alternative message forwarding example with a portion of the message body being the message part marked with one or more action restrictions in this example.

Still with reference to the example message from accounting, FIG. 6 is a screen shot 118 illustrating another example of a forwarded message composition derived from the original message 90. In this example, content forwarding is applied to a portion of the message body of the e-mail from accounting. In particular, the name and contact information of the original message are missing from the forwarded message composition because this portion was marked with the MIME attribute "Content Forwarding: denied". Also, in the illustrated example, the user of the device 10 is presented with an explanation embedded in the message notifying the user that the protected portion of the message body has not been included in the forwarded message composition. The user could also be made aware in alternative ways that a security precaution has been offended and that one or more protected portions of the message were not included in the forwarded message composition. For example, there could simply be a beep that sounds at some point during the message composition process, or a dialog box could pop up to notify the user that one or more portions of the message were not included in the forwarded message composition.

Although the examples illustrated in FIGS. 5 and 6 are forwarded message composition examples, it will be understood that, for consistency, it would be desirable to have the messaging application behave in the same manner with respect to a reply-to message composition. Although many messaging applications are configured by default to not have the original attachments included in a reply-to message composition, it could be that (like in the FIG. 6 example) the message text itself is to be protected.

It will be understood that action prevention in relation to higher security level parts is not limited to those actions that involve content forwarding off of the mobile communication device or other message processing machine. For example, the action prevention in relation to a higher security level part could be preventing the display of the higher level security part on a display in those situations when the message part does not even need to be sent to a server for decoding. This might be done if, for example, there were concerns about not being able to view the higher level security part in a font believed to make displayed text more tempest resistant. As another example, the e-mail security module 57 could be configured to force the display of any higher level security part in a font believed to make displayed text more tempest resistant. For instance, a user of the device 10 might have preconfigured the messaging application 56 to have the text in the message body 102 (FIG. 3) displayed in a font of his liking, but that font might not be the font believed to make displayed text more tempest resistant. Consequently, the module 57 could prevent the action of having the text in the message body 102 displayed in the default font, the text instead being displayed in a font perceived to be more tempest resistant.

The information provided by the MIME attribute need not be as simple as "denied" and "allowed". For example, a more granular system could be used to give finer detail on when to include the particular message part. In a classification system, there could be a number of levels of security. For instance, there could be four levels of security such as classified, confidential, secret and top secret, with top secret as the top level and classified as the bottom level. The messaging application of the user's mobile communication device could then be set up so that certain restrictions only apply above a certain level. For example, a message part having a security level of confidential or lower might be included in a forwarded message, but a message part having a security level of secret or higher might not be included in the forwarded message. In this case the threshold would be between confidential and secret. Of course any number of levels of security could be chosen for a classification system (e.g. three, four, five, etc.), and the levels between which the threshold(s) would be set could vary from one user to another.

One skilled in the art will appreciate that there might be situations where a server in communication with the user's mobile communication device could have access to the user's private keys. In such cases, the previously described MIME processing could possibly be done at the server rather than at the mobile communication device.

It will be understood that the needed security information about a message part could be obtained in some other way besides scanning the MIME header of a message part. For instance, in the case where the message part is an e-mail attachment, the information could be contained in the actual contents of the e-mail attachment. The messaging application in this embodiment would not scan the MIME header of the e-mail attachment, but would instead extract the needed information from the e-mail attachment part, for example.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method of handling an electronically transmitted message having at least two parts with a higher level security part having a higher level of security than an other part, the method comprising:

receiving a request to perform an action on said higher level security part;

extracting an attribute from said electronically transmitted message, said attribute indicating that said action is not permitted to be performed on said higher level security part; and indicating that said action is not permitted to be performed on said higher level security part.

2. The method of claim 1, wherein said message comprises an e-mail message.

3. The method of claim 2, wherein said higher level security part comprises an e-mail attachment.

4. The method of claim 3, wherein said action comprises displaying said e-mail attachment on a handheld device display.

5. The method of claim 1, wherein said action comprises sending said higher level security part to an attachment server for decoding.

6. The method of claim 1, wherein said action comprises forwarding said higher level security part through a communications medium.

7. The method of claim 6, wherein said communications medium includes a portion of the Internet.

8. The method of claim 1, wherein said indicating that said action is not permitted to be performed comprises displaying a message on a handheld device display.

9. A handheld electronic device having a messaging application permitting a recipient of an electronically transmitted message to take actions in relation to the message, said electronically transmitted message having at least two parts with a higher level security part having a higher level of security than an other part, the handheld device comprising:

a display screen;

a processor in electronic communication with said display screen, said processor capable of controlling operation of said display screen;

at least one computer readable medium storing code and in electronic communication with said processor, the code including:

i) computer executable instructions for receiving a request to perform an action on said higher level security part;

ii) computer executable instructions for extracting an attribute from said electronically transmitted message, said attribute indicating that said action is not permitted to be performed on said higher level security part; and iii) computer executable instructions for indicating that said action is not permitted to be performed on said higher level security part.

10. The handheld device of claim 9, wherein said processor is adapted to implement a classification system that is arranged to determine whether said action is permitted in relation to each of said at least two parts.

11. The handheld device of claim 10, wherein said classification system comprises at least three levels of security.

12. The handheld device of claim 11, wherein one of said levels of security is associated with said higher level security part of the message and a different and lower one of said levels of security is associated with said other part of the message.

13. The handheld device of claim 12, wherein said higher level security part of the message comprises an attached word processing document and said other part of the message comprises message text.

14. A tangible computer program product having a non-transitory computer readable storage medium storing a messaging application that can handle an electronically transmitted message having at least two parts with a higher level security part having a higher level of security than an other part, the messaging application comprising:

code for receiving a request to perform an action on said higher level security part;

code for extracting an attribute from said electronically transmitted message, said attribute indicating that said action is not permitted to be performed on said higher level security part; and code for indicating that said action is not permitted to be performed on said higher level security part.

15. The tangible computer program product of claim 14, wherein said action comprises sending said higher level security part to an attachment server for decoding.

16. The tangible computer program product of claim 14, wherein said action comprises forwarding said higher level security part through a communications medium.

17. The tangible computer program product of claim 14, wherein said messaging application further comprises code for extracting said attribute from MIME headers of said parts.

18. The tangible computer program product of claim 14, wherein said higher level security part comprises an e-mail attachment.

* * * * *